United States Patent
Ground et al.

(10) Patent No.: US 10,538,346 B2
(45) Date of Patent: Jan. 21, 2020

(54) ELECTRIC THRUSTER WASTE HEAT RECOVERY DURING SATELLITE ORBIT TRANSFER

(71) Applicant: Space Systems/Loral, LLC, Palo Alto, CA (US)

(72) Inventors: Cameron Ground, Sunnyvale, CA (US); Gordon Wu, Sunnyvale, CA (US); Derek Chan, Milpitas, CA (US)

(73) Assignee: Space Systems/Loral, LLC, Palo Alto, CA (US)

( * ) Notice: Subject to any disclaimer, the term of this patent is extended or adjusted under 35 U.S.C. 154(b) by 362 days.

(21) Appl. No.: 15/470,592

(22) Filed: Mar. 27, 2017

(65) Prior Publication Data

US 2018/0273215 A1   Sep. 27, 2018

(51) Int. Cl.
| | | |
|---|---|---|
| *B64G 1/50* | (2006.01) | |
| *B64G 1/58* | (2006.01) | |
| *F24F 13/02* | (2006.01) | |
| *B64G 1/26* | (2006.01) | |
| *B64G 1/40* | (2006.01) | |

(52) U.S. Cl.
CPC .............. *B64G 1/506* (2013.01); *B64G 1/26* (2013.01); *B64G 1/40* (2013.01); *B64G 1/503* (2013.01); *B64G 1/58* (2013.01); *F24F 13/02* (2013.01)

(58) Field of Classification Search
CPC .......... B64G 1/46; B64G 1/503; B64G 1/506; B64G 1/40; B64G 1/50; B64G 1/58
See application file for complete search history.

(56) References Cited

U.S. PATENT DOCUMENTS

| | | | | |
|---|---|---|---|---|
| 5,806,800 A | | 9/1998 | Caplin | |
| 5,823,476 A | * | 10/1998 | Caplin .................... | B64G 1/428 244/158.1 |
| 5,823,477 A | * | 10/1998 | York ....................... | B64G 1/503 244/171.8 |
| 5,954,298 A | * | 9/1999 | Basuthakur ............ | B64G 1/402 165/41 |
| 6,073,888 A | * | 6/2000 | Gelon ...................... | B64G 1/50 165/104.22 |
| 6,378,809 B1 | * | 4/2002 | Pon ......................... | B64G 1/503 244/171.8 |

(Continued)

FOREIGN PATENT DOCUMENTS

| | | |
|---|---|---|
| EP | 0 786 404 A1 | 7/1997 |
| JP | H 11-263300 A | 9/1999 |

OTHER PUBLICATIONS

Extended European Search Report dated Jul. 27, 2018 in EP Application No. 18164359.4.

*Primary Examiner* — Philip J Bonzell
*Assistant Examiner* — Tye William Abell
(74) *Attorney, Agent, or Firm* — Weaver Austin Villeneuve & Sampson LLP

(57) ABSTRACT

A spacecraft includes a spacecraft main body, including payload equipment disposed on an inner panel surface of at least one radiator panel, the at least one radiator panel having an exterior-facing outer panel surface. The spacecraft includes at least one electric thruster disposed proximate to an aft facing panel of the spacecraft main body. The at least one electric thruster is thermally coupled with the at least one radiator panel by way of a thermally conductive path.

14 Claims, 6 Drawing Sheets

Detail A

(56) References Cited

U.S. PATENT DOCUMENTS

| | | | |
|---|---|---|---|
| 6,478,257 B1* | 11/2002 | Oh | B64G 1/405 244/171.7 |
| 6,776,220 B1 | 8/2004 | Low et al. | |
| 7,059,571 B2 | 6/2006 | Kellberg | |
| 7,624,950 B2 | 12/2009 | D'Ausilio et al. | |
| 7,762,499 B1* | 7/2010 | Hentosh | B64G 1/50 165/41 |
| 8,240,612 B2* | 8/2012 | Jondeau | B64G 1/50 244/171.7 |
| 2004/0164205 A1* | 8/2004 | Kellberg | B64G 1/405 244/171.1 |
| 2007/0040067 A1 | 2/2007 | D'Ausilio et al. | |
| 2016/0114909 A1 | 4/2016 | Walker | |

* cited by examiner

ELECTRIC THRUSTER WASTE HEAT RECOVERY DURING SATELLITE ORBIT TRANSFER

TECHNICAL FIELD

This invention relates generally to thermal control techniques, and, more particularly, to an improved spacecraft thermal control arrangement for recovery of electric thruster waste heat.

BACKGROUND OF THE INVENTION

The assignee of the present invention manufactures and deploys spacecraft for, inter alia, communications and broadcast services.

Such spacecraft are equipped with on board propulsion systems, including electric thrusters, for orbit transfer from a launch vehicle transfer orbit (or "parking orbit") to an operational orbit, for example, to a geosynchronous orbit. In some implementations, the electric thruster's orbit transfer functions relate to the task of transferring a spacecraft from an initial lower orbit (into which the spacecraft has been injected by a launch vehicle) to, for example, an intermediate orbit or an operational orbit. Where electric thrusters are used for part or all of the orbit transfer function, a substantial mass savings may be achieved, by virtue of the electric thrusters' high specific impulse (Isp). Significant periods of time (e.g., several weeks) may be required for the orbit transfer phase of the spacecraft's life, however, as a result of the electric thruster's low thrust. During orbit transfer, a considerable fraction of the spacecraft power is required for operating the electric thrusters and to operate heaters necessary to avoid unacceptably low spacecraft payload temperatures.

FIG. 1 illustrates a known spacecraft incorporating electric thrusters. A spacecraft 100 includes a main body 110 having side walls including payload mounting radiator panels such as panel 111.

Electric thrusters configured to support orbit transfer maneuvers are disposed proximate to an aft surface 112 of the spacecraft main body 110. During orbit transfer operations, firing the electric thrusters may result in a power draw of several kilowatts per thruster, while the spacecraft payload may be powered off. For example, two or more 140 mm diameter stationary plasma thrusters (SPT 140s) may be fired simultaneously each SPT 140 having a nominal operating power of 4.5 KW. Electric thrusters are generally mounted on a radiator plate that is thermally isolated from the rest of the spacecraft. For example, referring now to Detail A, electric thruster 123 may be mounted on a radiator plate 125 that is thermally isolated by thermal blanket 127 and minimally conductive standoffs 129. Where the electric thruster 123 is an SPT 140 operating at 4.5 kW, about 200 W of waste heat is conducted through a baseplate of the SPT-140 and into the radiator plate 125. The radiator plate 125 may ordinarily be designed to dissipate substantially all of the 200 W waste heat by radiation to space, with little or no waste heat being transmitted to the spacecraft main body 110.

SUMMARY

The present disclosure contemplates an improved arrangement for recovery of electric thruster waste heat during satellite orbit transfer.

According to some implementations, a spacecraft includes a spacecraft main body, including payload equipment disposed on an inner panel surface of at least one radiator panel, the at least one radiator panel having an exterior-facing outer panel surface, and at least one electric thruster disposed proximate to an aft facing panel of the spacecraft main body. The at least one electric thruster is thermally coupled with the at least one radiator panel by way of a thermally conductive path.

In some examples, in an on-orbit configuration the exterior-facing outer panel surface may face generally north or south.

In some examples, the electric thruster may be fixedly coupled with the aft facing panel of the spacecraft main body.

In some examples, the thermally conductive path may include one or more heat pipes. In some examples, in an on-orbit configuration, the at least one radiator panel may include a first radiator panel having a first exterior-facing outer panel surface facing generally North and a second radiator panel having a second exterior-facing outer panel surface facing generally South and the one or more heat pipes thermally couple the first radiator panel and the second radiator panel. In some examples, at least a portion of the one or more heat pipes may be disposed on or embedded in the aft facing panel. In some examples, the electric thruster may be coupled with the aft facing panel of the spacecraft main body by way of one or more gimbals. In some examples, at least a portion of the one or more heat pipes may be flexible.

In some examples, the electric thruster may be mounted to the aft facing panel by way of a mounting plate and a thermal blanket is configured so as to substantially impede radiation of heat from the mounting plate to space. In some examples, the thermal blanket may be configured so as to substantially impede radiation of heat to space from at least a sidewall portion of the electric thruster.

According to some implementations, a method for executing an orbit transfer maneuver for a spacecraft includes firing at least one electric thruster, transferring waste heat from the electric thruster to a radiator panel of a main body of the spacecraft, the radiator panel including payload equipment disposed on an inner panel surface, the radiator panel including heaters, and reducing, during at least a duration of firing the at least one electric thruster, an amount of power supplied to the heaters.

In some examples, the amount of power supplied to the heaters may be reduced by approximately an amount of transferred waste heat from the electric thruster.

In some examples, the electric thruster may be disposed proximate to an aft facing panel of the main body of the spacecraft and the transferring waste heat from the electric thruster may include conductively transferring the waste heat from the electric thruster to the radiator panel by way of a thermally conductive path. In some examples, in an on-orbit configuration, the exterior-facing outer panel surface may face generally north or south. In some examples, the electric thruster may be fixedly coupled with the aft facing panel of the spacecraft main body. In some examples, the thermally conductive path may include one or more heat pipes. In some examples, at least a portion of the one or more heat pipes may be disposed on or embedded in the aft facing panel. In some examples, the electric thruster may be coupled with the aft facing panel of the spacecraft main body by way of one or more gimbals. In some examples, at least a portion of the one or more heat pipes may be flexible. In some examples, the electric thruster may be mounted to the aft facing panel by way of a mounting plate and a thermal blanket is configured so as to substantially impede radiation of heat to space from one or both of the mounting plate and at least a sidewall portion of the electric thruster.

BRIEF DESCRIPTION OF THE DRAWINGS

Features of the invention are more fully disclosed in the following detailed description of the preferred embodiments, reference being had to the accompanying drawings, in which.

Figure 1:
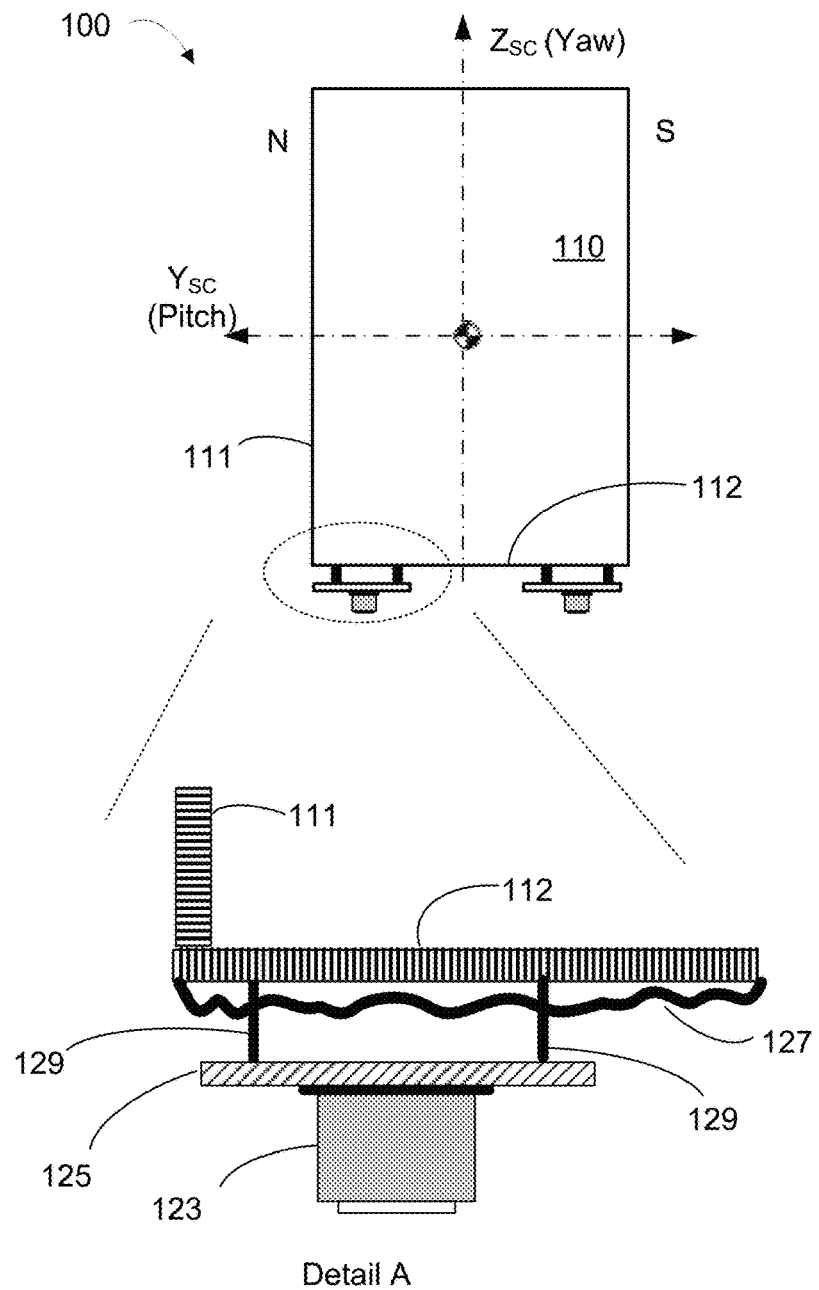
FIG. 1 illustrates a known spacecraft incorporating electric thrusters.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION

Specific examples of embodiments will now be described with reference to the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "connected" or "coupled" to another element, it can be directly connected or coupled to the other element, or intervening elements may be present. It will be understood that although the terms "first" and "second" are used herein to describe various elements, these elements should not be limited by these terms. These terms are used only to distinguish one element from another element. As used herein, the term "and/or" includes any and all combinations of one or more of the associated listed items. The symbol "/" is also used as a shorthand notation for "and/or".

The presently disclosed techniques contemplate configuring a thermally conductive coupling path between one or more electric thrusters and a spacecraft payload mounting radiator panel such that waste heat generated during thruster firing may be used to heat payload equipment.

Figure 2:
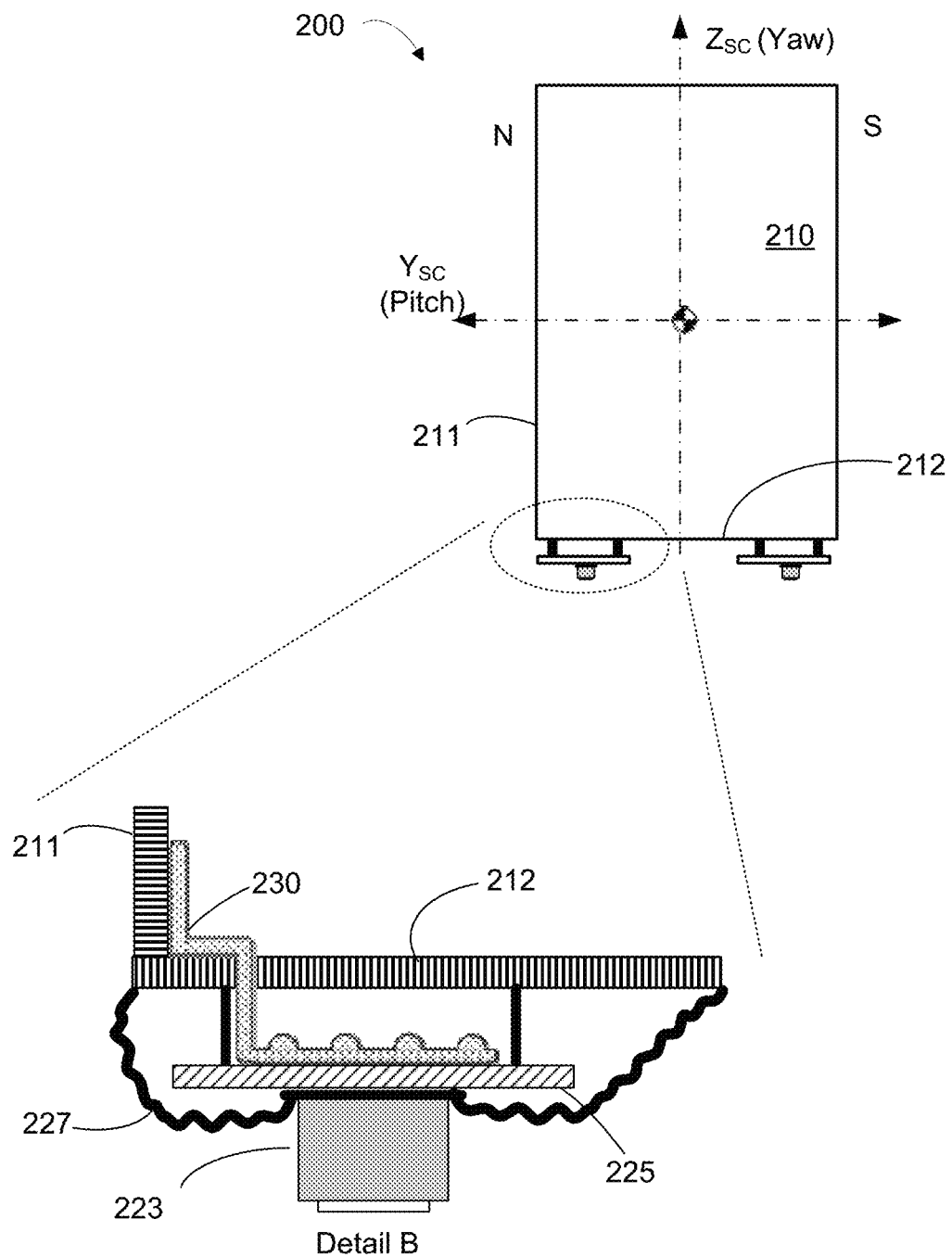
FIG. 2 illustrates a diagram of an example of a spacecraft configured in accordance with the presently disclosed techniques.

FIG. 2 illustrates a diagram of an example of a spacecraft configured in accordance with the presently disclosed techniques. A spacecraft 200 includes a main body 210 having side walls including payload mounting radiator panels such as the panel 211.

Electric thrusters 223 configured to provide impulse for orbit transfer maneuvers are disposed proximate to an aft portion of the spacecraft main body 210. More particularly, in the illustrated implementation, the electric thrusters 223 are disposed proximate to an aft facing panel 212. An electric thruster, as the term is used herein, and in the claims, converts electrical energy to propellant kinetic energy substantially without regard to any chemical energy the propellant may possess. For example, an electric thruster may operate by ionizing and accelerating a gaseous propellant, where the propellant is a noble gas of a heavy element, such as xenon or argon. Irrespective of the selected propellant, a negligible amount of thrust results from energy chemically stored in the propellant. The term electric thruster, as used herein and in the claims, encompasses an electrostatic thruster, an electromagnetic thruster, a Hall Effect thruster, such as an SPT, for example, a Wakefield accelerator, and a traveling wave accelerator, for example.

As discussed above, during orbit transfer operations the thrusters may draw several kilowatts of spacecraft power, while the spacecraft payload may be powered off. For example, two or more SPT 140s may be fired simultaneously, each SPT 140 having a nominal operating power of 4.5 KW.

Payload components such as amplifiers that dissipate heat when the payload is operating are normally disposed on payload mounting radiator panels such as the panel 211 so as to efficiently dissipate waste heat from these elements when the payload is powered on. During orbit transfer operations, (i.e., in the absence of heat dissipation from the payload elements) the payload mounting radiator panels require heaters to be powered up in order to prevent temperature excursions below a specified value. The power required for heaters represents lost electrical power that could otherwise be used, for example, to operate the electric thrusters at a higher power and thrust and thereby reduce orbit transfer duration.

In the illustrated implementation, each electric thruster 223 is mounted on a respective mounting plate 225 that is thermally coupled with the panel 211 by way of a respective thermally conductive path 230. In the illustrated implementation, as may be better observed in Detail B, a thermal blanket 227 may be configured so as to substantially impede radiation of heat from mounting plate 225 to space.

Where the electric thruster 223 is an SPT 140 operating at 4.5 kW, about 170 W of waste heat may be conducted from the mounting plate 225 to the panel 211. Thus, according to the presently disclosed techniques, a substantial portion of waste heat from electric thruster 223 is distributed by way of thermally conductive path 230 to the panel 211. As a result, the amount of power required by payload panel heaters during orbit transfer operations may be correspondingly reduced. For example, in some implementations about 170 W per operating SPT 140 may be saved. The saved heater power may be advantageously used to operate the electric thrusters at a higher power level, thereby shortening the orbit transfer duration.

The thermally conductive path may be or include one or more heat pipes. In some implementations, a mounting plate 235 on which the thrusters are disposed may be fixedly coupled with the aft facing panel 212. In other implementations, the mounting plate 235 may be coupled with the aft facing panel 212 by way of one or more gimbals or other thruster steering mechanisms (not illustrated). In such implementations, at least a portion of the heat pipes may have a flexible portion that accommodates motion of the mounting plate 225 with respect to the aft facing panel 212.

Figure 3:
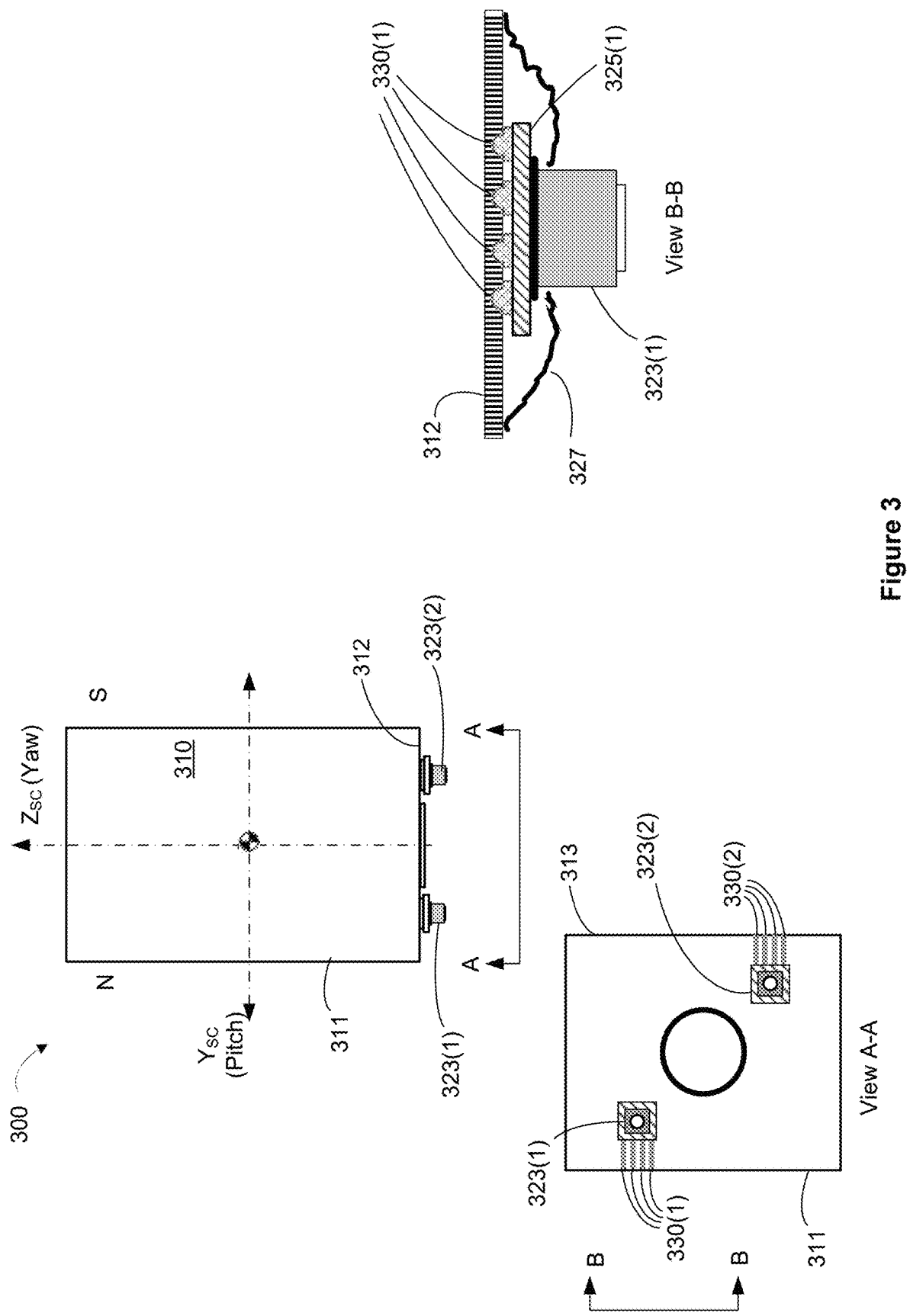
FIG. 3 illustrates a diagram of an example of a spacecraft configured in accordance with another implementation.

FIG. 3 illustrates a diagram of an example of a spacecraft configured in accordance with another implementation. A spacecraft 300 includes a main body 310 having side walls including payload mounting radiator panels such as panels 311 and 313.

Electric thrusters 323 configured to support orbit transfer operations are disposed proximate to an aft facing panel 312 of the spacecraft main body 310. Payload components, such as amplifiers that dissipate heat when the payload is operating, may be disposed on payload mounting radiator panels such as a North facing panel 311 and a South facing panel 313 so as to efficiently dissipate waste heat from these elements when the payload is powered on. In the illustrated implementation, each electric thruster 323 is mounted on a respective mounting plate 325. Each mounting plate 325 may be thermally coupled with a respective North or South facing radiator panel 311 or 313 by way of heat pipes 330. For example, as may be better observed in Views A-A and B-B, heat pipes 330(1) may be thermally coupled with the mounting plate 325(1) and with a surface of the aft facing panel 312. In the illustrated implementation, as may be better observed in View B-B, a thermal blanket 327 may be configured so as to substantially impede radiation of heat from mounting plate 225 to space In some implementations the heat pipes 330(1) may be partially or completely embedded in the aft facing panel 312. The heat pipes 330(1) may be thermally coupled with the North facing panel 311 by way of additional heat pipes (not illustrated) disposed on or within the North facing panel 311.

In some implementations, each electric thruster 323 is thermally coupled with a respective North or South facing panel south. In the illustrated implementation, for example, the thruster 323(1) may be thermally coupled with North facing panel 311 by a respective set of heat pipes 330(1). Similarly, the thruster 323(2) may be thermally coupled with the South facing panel 313 by a respective set of heat pipes 330(2).

Figure 4:
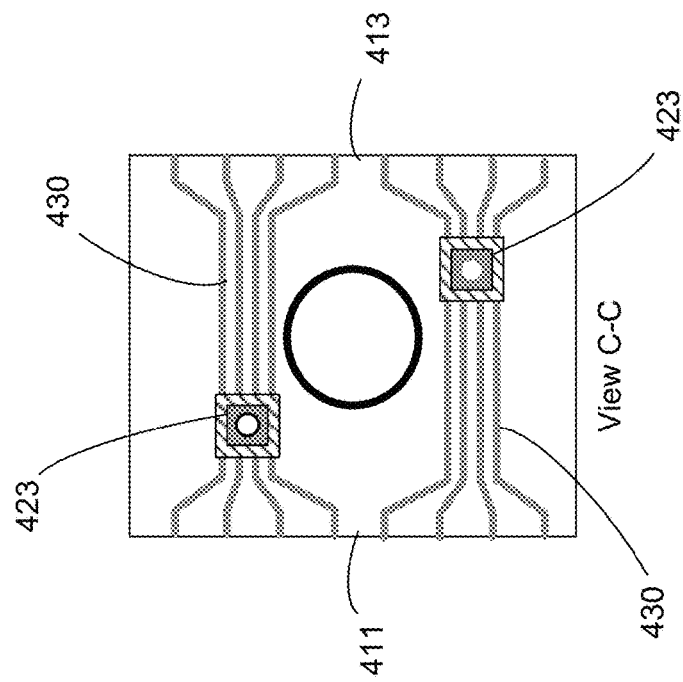
FIG. 4 illustrates a diagram of an example of a spacecraft configured in accordance with a yet further implementation.
Figure 4:
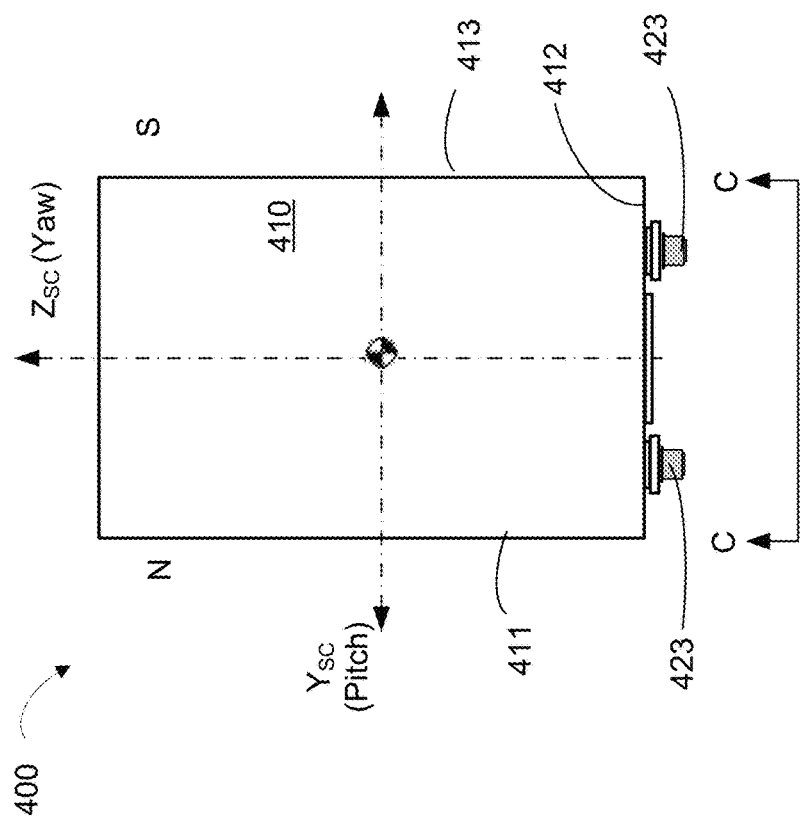

FIG. 4 illustrates a diagram of an example of a spacecraft configured in accordance with a yet further implementation. A spacecraft 400 includes a main body 410 having side walls including payload mounting radiator panels such as North facing panel 411 and South facing panel 413. As may be better observed in View C-C "crossing" heat pipes 430 may be configured to extend between, and thermally couple, the South facing panel 411 and the North facing panel 413. Such crossing heat pipes have been described by the assignee of the present invention in U.S. Pat. No. 6,776,220, the disclosure of which is hereby incorporated by reference in its entirety into the present application for all purposes.

In the illustrated implementation, each thruster 423 is thermally coupled with crossing heat pipes 430, either directly, or by way of an intermediate mounting plate. Thus, it will be appreciated that, in the implementation illustrated in FIG. 4, each electric thruster 423 is thermally coupled with both the North facing panel 411 and the South facing panel 413.

Figure 5:
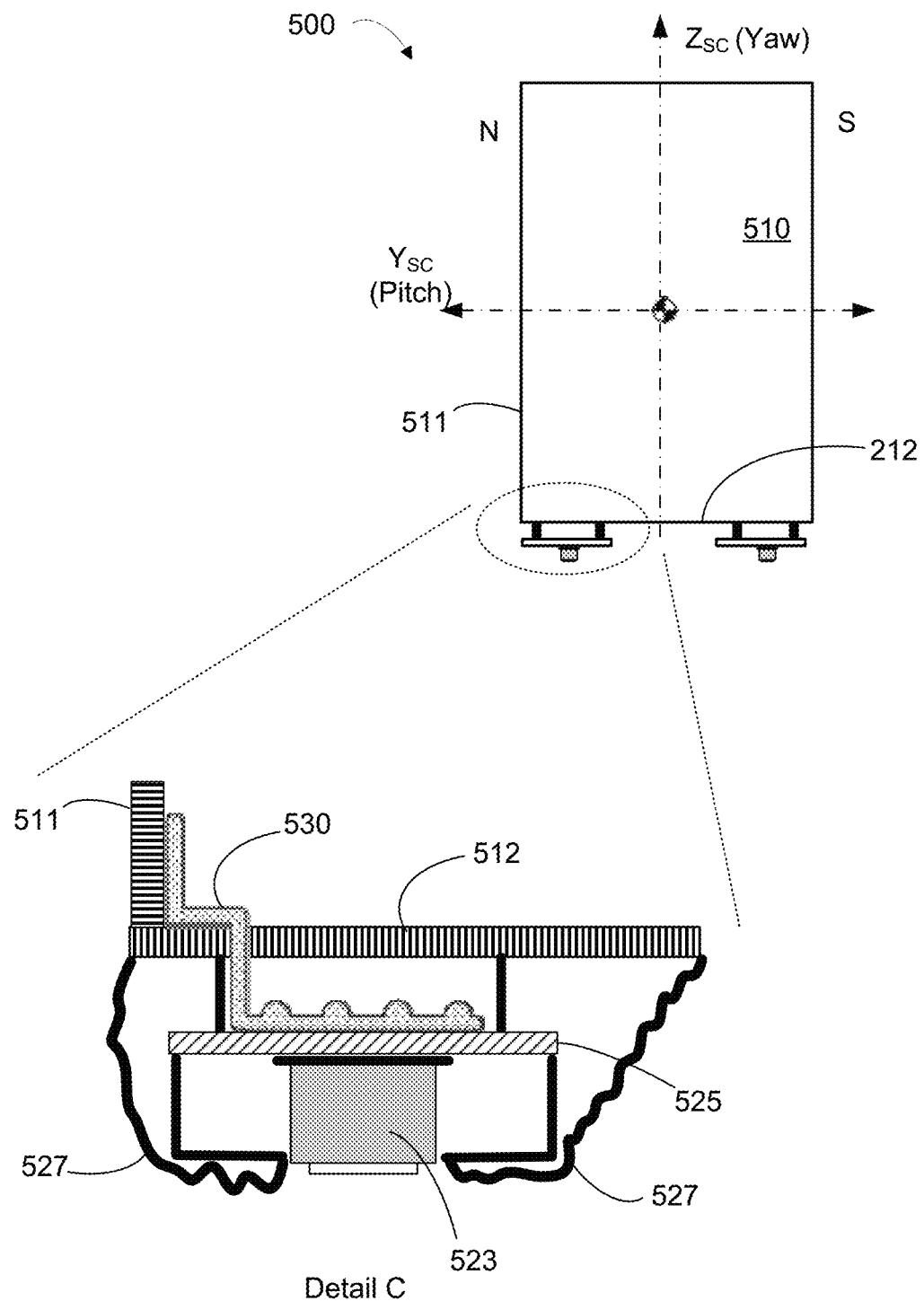
FIG. 5 illustrates a diagram of an example of a spacecraft configured in accordance with another implementation.

FIG. 5 illustrates a diagram of an example of a spacecraft configured in accordance with another implementation. A spacecraft 500 includes a main body 510 having side walls including payload mounting radiator panels such as the panel 511. Electric thrusters 523 configured to provide impulse for orbit transfer maneuvers are disposed proximate to an aft facing panel 512 of the spacecraft main body 510.

In the illustrated implementation, each electric thruster 223 is mounted on a respective mounting plate 525 that is thermally coupled with the panel 511 by way of a respective thermally conductive path 230. In the illustrated implementation, as may be better observed in Detail C, a thermal blanket 527 may be configured so as to substantially impede radiation of heat to space from mounting plate 225 and from side walls of thruster 523.

Figure 6:
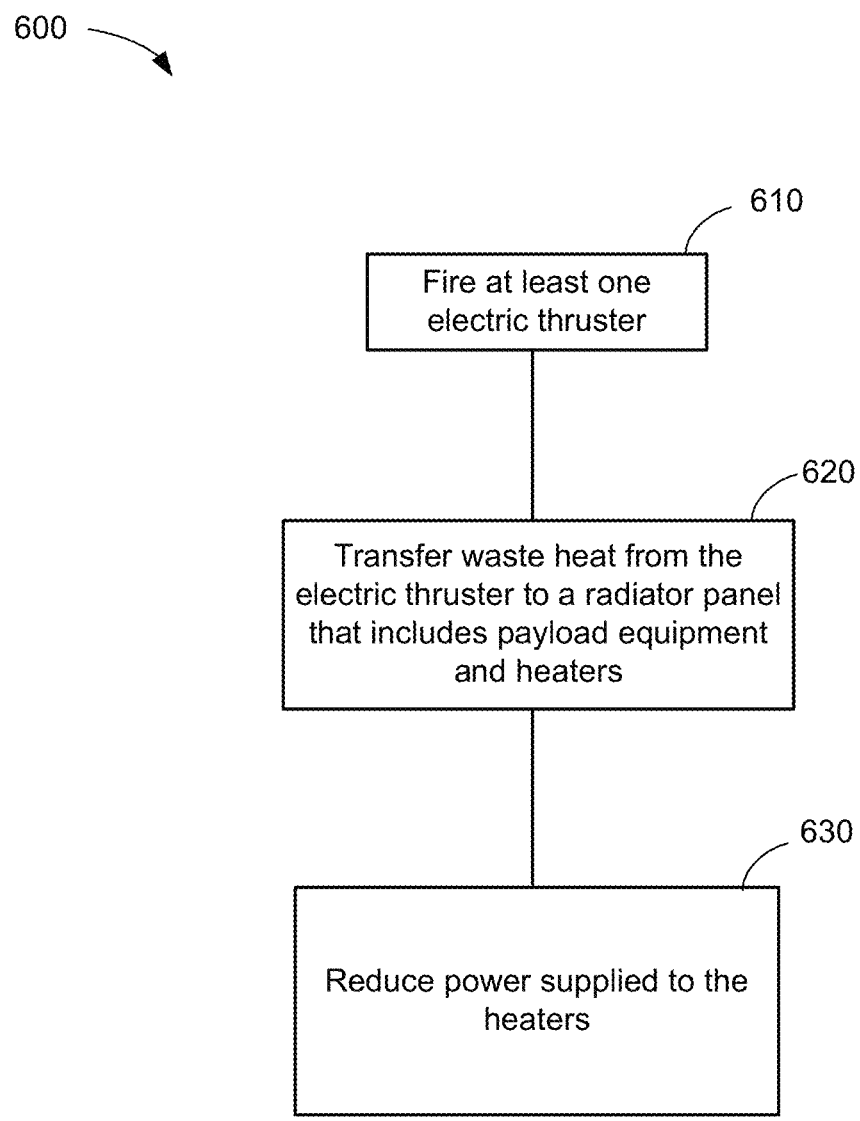
FIG. 6 illustrates a method for or executing an orbit transfer maneuver for a spacecraft, according to an implementation.

Referring now to FIG. 6, a method 600 for executing an orbit transfer maneuver for a spacecraft is illustrated. The method 600 may begin, at block 610 with firing at least one electric thruster. As described hereinabove, the electric thruster may be, for example, an electrostatic thruster, an electromagnetic thruster, a Hall Effect thruster, such as an SPT, a Wakefield accelerator, or a traveling wave accelerator.

At block 620, waste heat from the electric thruster may be transferred to a radiator panel of a main body of the spacecraft, the radiator panel including payload equipment disposed on an inner panel surface, the radiator panel including heaters.

At block 630, power supplied to the heaters may be reduced. In some implementations, the amount of power supplied to the heaters is reduced by approximately an amount of transferred waste heat from the electric thruster.

Thus, an improved spacecraft thermal control arrangement for recovery of electric thruster waste heat has been disclosed. The foregoing merely illustrates principles of the invention. It will thus be appreciated that those skilled in the art will be able to devise numerous systems and methods which, although not explicitly shown or described herein, embody said principles of the invention and are thus within the spirit and scope of the invention as defined by the following claims.

What is claimed is:

1. A spacecraft comprising:
a spacecraft main body, including at least a first side wall configured as a radiator panel having an exterior-facing outer panel surface and a second wall panel disposed transversely to the first side wall;
payload equipment disposed on an inner panel surface of the radiator panel; and
at least one electric thruster disposed proximate to the second wall panel;
wherein the at least one electric thruster is thermally coupled with the at least one radiator panel by way of a thermally conductive path; and
wherein the thermally conductive path includes one or more heat pipes.

2. The spacecraft of claim 1, wherein the electric thruster is fixedly coupled with the second wall panel of the spacecraft main body.

3. The spacecraft of claim 1, wherein the electric thruster is mounted to the second wall panel by way of a mounting plate and a thermal blanket is configured so as to substantially impede radiation of heat from the mounting plate to space.

4. The spacecraft of claim 3, wherein the thermal blanket is configured so as to substantially impede radiation of heat to space from at least a sidewall portion of the electric thruster.

5. The spacecraft of claim 1, wherein at least a portion of the one or more heat pipes is disposed on or embedded in the second wall panel.

6. The spacecraft of claim 5, wherein the electric thruster is coupled with the second wall panel of the spacecraft main body by way of one or more gimbals.

7. The spacecraft of claim 6, wherein at least a portion of the one or more heat pipes is flexible.

8. A method for executing an orbit transfer maneuver for a spacecraft, the method comprising:

firing at least one electric thruster;

transferring waste heat from the electric thruster to a radiator panel of a main body of the spacecraft, the radiator panel including payload equipment disposed on an inner panel surface, the radiator panel including heaters; and reducing, during at least a duration of firing the at least one electric thruster, an amount of power supplied to the heaters; wherein the main body includes a first side wall including the radiator panel, and the electric thruster is disposed proximate to a second wall panel disposed transversely to the first side wall; and the transferring waste heat from the electric thruster includes conductively transferring the waste heat from the electric thruster to the radiator panel by way of a thermally conductive path;

wherein the thermally conductive path includes one or more heat pipes.

9. The method of claim 8, wherein the amount of power supplied to the heaters is reduced correspondingly by an amount of transferred waste heat from the electric thruster.

10. The method of claim 8, wherein the electric thruster is fixedly coupled with the second wall panel of the spacecraft main body.

11. The method of claim 8, wherein the electric thruster is mounted to the second wall panel by way of a mounting plate and a thermal blanket is configured so as to substantially impede radiation of heat to space from one or both of the mounting plate and at least a sidewall portion of the electric thruster.

12. The method of claim 8, wherein at least a portion of the one or more heat pipes is disposed on or embedded in the aft facing panel.

13. The method of claim 12, wherein the electric thruster is coupled with the second wall panel of the spacecraft main body by way of one or more gimbals.

14. The method of claim 13, wherein at least a portion of the one or more heat pipes is flexible.

* * * * *